Dec. 2, 1924.          1,517,836
J. H. HAND
CHANGE SPEED GEARING
Filed Oct. 29, 1923    2 Sheets-Sheet 1

INVENTOR.
Jesse H. Hand
BY Ralzemond A. Parker
ATTORNEY.

Dec. 2, 1924.

J. H. HAND

CHANGE SPEED GEARING

Filed Oct. 29, 1923

INVENTOR.
Jesse H. Hand
BY Ralzemond A. Parker
ATTORNEY.

Patented Dec. 2, 1924.

1,517,836

UNITED STATES PATENT OFFICE.

JESSE H. HAND, OF CHICAGO, ILLINOIS.

CHANGE-SPEED GEARING.

Application filed October 29, 1923. Serial No. 671,326.

*To all whom it may concern:*

Be it known that I, JESSE H. HAND, a citizen of the United States, residing at Chicago, county of Cook, State of Illinois, have invented a certain new and useful Improvement in Change-Speed Gearing, and declare the following to be a full, clear, and exact description of the same, such as will enable others skilled in the art to which it pertains to make and use the same, reference being had to the accompanying drawings, which form a part of this specification.

My invention relates to improvements in change-speed gears, particularly to those adapted for use with self-propelled vehicles.

Reference is herein made to my Patent No. 1,472,122, dated October 30, 1923, in which certain of the features herein shown are disclosed and claimed.

The instant application relates to the provision of improved clutch mechanism to couple the main shaft with the drive shaft to be driven therefrom at varying rates of speed and to an improved main shaft construction and its support.

A meritorious feature is the provision of a drive shaft having an improved hollow hub to receive the free end of the main shaft which is so supported as to run true without wobble in the hub and a clutch device operable to engage a clutch member rigid on the main shaft to couple the main shaft to the drive shaft to rotate therewith and also operable to engage a second clutch member rotatable on the drive shaft to couple the main shaft to the drive shaft for driving at varying lessened rates of speed.

An important structural feature is the provision in such a construction of a clutch ring movably supported on the hollow hub and having a clutch portion extending into the interior of the hub to engage a clutch collar rigid on the main shaft to cause the main shaft to rotate with the drive shaft when the clutch ring is operated in one direction and adapted to move through a neutral zone of complete disengagement to engage for rotation a rotatable drive pinion on the main shaft to drive the main shaft at varying rates of speed.

In the drawings,—

Figure 1:
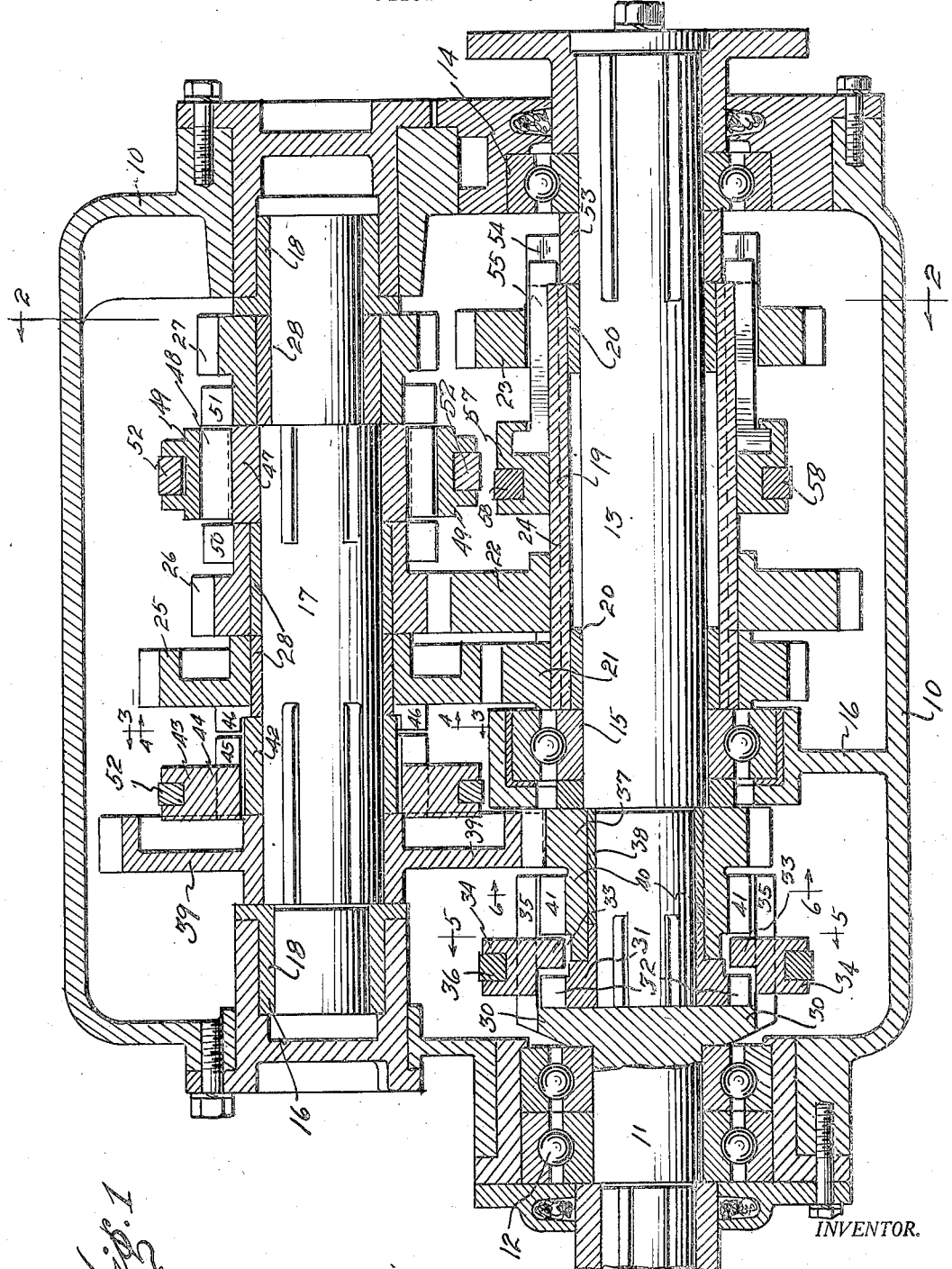
Figure 1 is a longitudinal sectional view through my change-speed gearing.

Figs. 3, 4, 5 and 6 are sectional views taken on section lines 3—3, 4—4, 5—5 and 6—6, respectively, of Fig. 1.

In the drawings, 10 indicates the change-speed gearing housing. The drive shaft 11 is supported at the forward end by a suitable bearing 12. The main shaft 13 is supported at the rear by a suitable bearing 14 and at an intermediate position adjacent its forward end by a bearing 15 which is suitably carried by a bracket 16 extending upwardly from the housing so that the forward free end of the main shaft will run true without wobbling. The countershaft 17 is supported at front and rear by suitable bushings 18 carried in the housing.

The main shaft carries a freely running sleeve 19 shown as supported thereon by bushings 20, which sleeve is adapted to permit independent rotation of the main shaft or to be locked on the shaft to rotate the same. The sleeve carries an intermediate speede gear 21, a slow speed gear 22, and a reverse gear 23. These gears are secured to the sleeve by a plurality of splines 24, eight being here shown, to rotate with the sleeve.

The countershaft carries a corresponding train of gears, an intermediate speed gear 25, a low speed gear 26, and a reverse gear 27. These gears are mounted on the countershaft by suitable bushings 28 to permit the shaft to rotate independently of any gear. Locking members are provided to couple individual gears to the countershaft to rotate therewith. The intermediate speed gears and the low speed gears on the main shaft and countershaft are in constant direct engagement. The reverse gears are engaged by a silent chain 29, shown in Fig. 2.

I provide simplified improved clutch mechanism to couple the drive shaft with the main shaft to drive the main shaft at varying rates of speed. This comprises a hub 30 carried by the drive shaft to rotate therewith, which hub is hollowed out to receive the end of the main shaft. Interior of the hub a clutch collar 31 is splined on the end of the main shaft, as appears in Figs. 1 and 5. This clutch collar is cut away to provide locking recesses 32 adapted to receive internal teeth or lugs 33 carried by the high speed clutch ring 34. These teeth, four of which are shown, travel in slots or guideways 35 in the wall of the hub 30. The clutch ring which encircles the hub for movement therealong is actuated by a shifter fork band 36 which encircles the ring disposed in a peripheral groove thereabout adapted to permit independent rotation of the ring with the hub while providing means to move the ring lengthwise the hub. The fork itself is not shown in the drawing.

A main shaft drive pinion 37 supported by a bushing 38 is mounted on the main shaft adjacent the hub for independent rotation. This drive pinion engages a drive gear 39 splined on the countershaft to rotate the countershaft. This drive pinion has a hub 40 extending into the interior of the hollow hub 30 and overlapping the hub of the clutch collar 31. Hub 40 of the drive pinion is provided with locking recesses 41, four being here shown, disposed opposite the recesses 32 in the clutch collar. The recesses 41 in the drive pinion hub are spaced from the recesses 32 in the clutch collar to provide a neutral zone between the clutch collar and drive pinion within which the operable clutch member (the internal teeth 33 on the clutch ring 34) may be disposed. The internal teeth or lugs 33 of this operable clutch member or the high-speed clutch ring are adapted to engage the locking recesses 41 of the main shaft drive pinion for rotation and are also adapted to be moved to engage the locking recesses 32 of the clutch collar 31.

When the clutch ring 34 is engaged with the clutch collar 31 the main shaft rotates with the drive shaft independently of the change-speed gears. When the clutch ring is disengaged from the clutch collar and its internal teeth are engaged in the recesses 41 of the hub of the main shaft drive pinion 37, the drive pinion 37, the gear 39, and countershaft, are driven by the driving shaft. In this latter position separate sets of change-speed gears on the countershaft and main shaft may be picked up to drive the main shaft at varying rates of speed.

Figure 4:
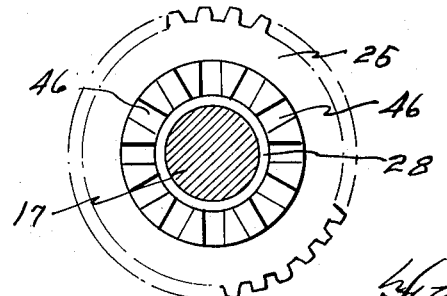
Figure 5:
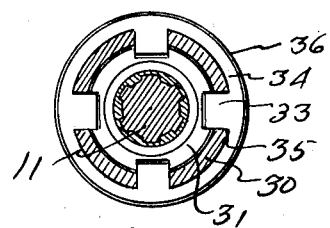
Figure 6:
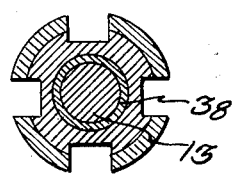

An intermediate speed hub 42 is splined on the countershaft to rotate therewith adjacent the intermediate speed gear 25. An intermediate speed clutch ring 43 encircles this hub. This clutch ring is provided with internal teeth or lugs 44 which travel in guideways or channels 45 in the hub. These teeth are adapted to engage in recesses 46 formed in the hub of the intermediate speed gear 25. A multiplicity of such recesses is shown in Fig. 4. I have illustrated the clutch ring 43 in Fig. 3 as carrying six teeth disposed in slots 45 in the hub 42 and adapted to be moved into engagement with the recesses 46 in the intermediate gear 25.

Similarly I provide a reverse speed hub 47 splined on the countershaft adjacent the reverse speed gear 27. This hub 47 is provided with suitable grooves or guideways within which are disposed the teeth 48 formed on a reverse clutch ring 49. This reverse clutch ring and hub are adapted also to cooperate with the low-speed gear mounted on the opposite side thereof from the reverse speed gear in the same manner as with the reverse speed gear. Locking recesses 50 are formed on the hub of the low-speed gear 26 and locking recesses 51 are formed on the hub of the reverse speed gear 27. The lugs 48 of the low and reverse clutch ring are adapted to be engaged in either set of recesses to lock either gear to the countershaft to rotate therewith.

Each clutch ring is adapted to be actuated by a shifter fork having connection with the gear control lever. The shifter fork is not shown but I have illustrated the shifter fork band 52 which encircles the clutch ring member to permit rotation thereof while adapted to actuate the same longitudinally of the shaft.

Figure 2:
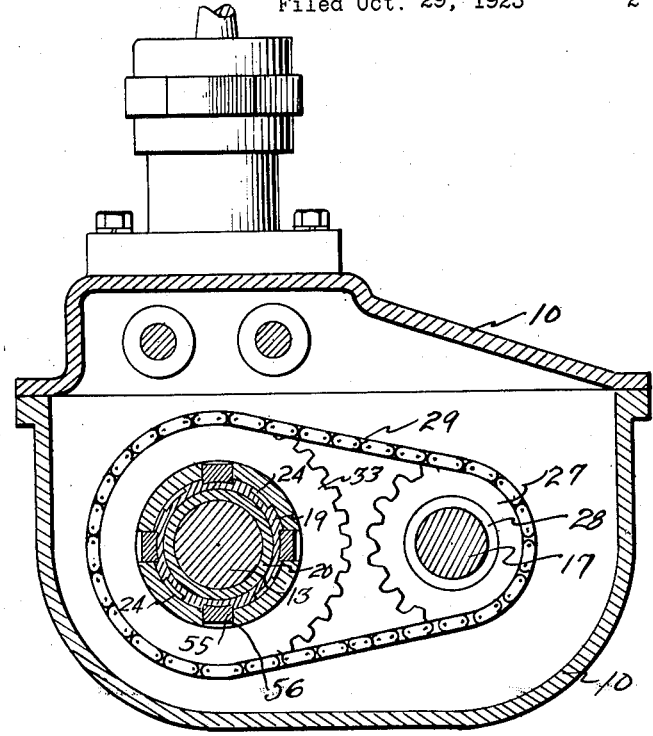
Fig. 2 is a transverse sectional view taken on line 2—2, Fig. 1.
Figure 3:
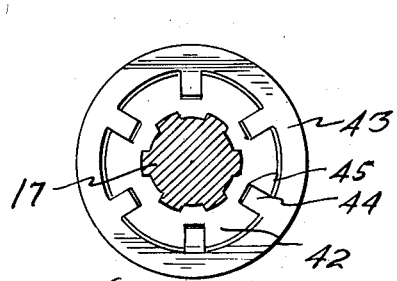

The clutch hub 53 is splined on the rear end of the main shaft adjacent the reverse gear 23. This hub is provided with recesses 54 adapted to receive sliding keys 55. Four recesses are illustrated in Fig. 2. These keys travel in guideways or channels 56 formed in the outer surface of the sleeve 19. For this purpose I make use of four of the splined channels in the sleeve and cut away the gear 23 above the four splined channels to provide passageways for the keys through the gear, as shown in Figs. 1 and 2. The keys are actuated by a key shifter ring 57 which in turn is actuated by an encircling band 58 of the shifter fork (not shown in the drawing).

In the operation of the device the mechanism is illustrated in Fig. 1 with the high-speed clutch ring disposed in the disengaged position between the high-speed clutch collar and the clutch drive pinion on the main shaft. To couple the main shaft directly with the drive shaft to drive the main shaft independently of the change-speed gears the high-speed ring 34 is moved forwardly to bring the lugs 33 into engagement with the locking recesses 32 in the clutch collar 31. In this position the main shaft rotates with the drive shaft independently of sleeve 19.

If the high-speed clutch ring 34 is moved out of engagement with the clutch collar into the position illustrated in Fig. 1, the clutch teeth 33 are completely disengaged and the change-speed gears are idle. Continuing the movement of the high-speed ring 34 toward the drive pinion 37, the teeth 33 are brought into engagement with the locking recesses 41 formed on the hub 40 of the main shaft drive pinion 37, locking such pinion to the drive shaft to be rotated thereby. This pinion 37 drives the gear 39 and through such gear the countershaft.

The connection between the gear shift lever through the shifter forks with the change-speed gearing is not illustrated as it forms no part of the present invention but such a construction is a conventional one.

The clutch rings 43 and 57 are coupled with the clutch ring 34 to move longitudinally therewith. In Fig. 1 the gearing is shown in what might be termed a safety position. The clutch ring 34 is disposed in the intermediate space between the locking hub of the drive pinion and the locking recesses of the clutch collar 31. The clutch ring 43 is shown disengaged from the adjacent gear 25 on the countershaft. The clutch ring 57 is shown with the keys 55 in engagement with the hub 53 on the main shaft but in this position it will be remembered there is no driving connection between the drive shaft and the countershaft or main shaft.

If it is desired to drive the gearing at high speed the clutch ring 34 is moved forwardly to bring the teeth 33 into engagement with the locking recesses 32 of the clutch collar. This movement of the clutch ring 34 disengages the keys 55 from the locking recesses 54 of the hub 53, disconnecting the main shaft from the sleeve 19. In this position the main shaft rotates with the drive shaft independently of the change-speed gears.

To drive the main shaft through the countershaft the clutch ring 34 is moved out of engagement with the clutch collar 31 and through the intermediate position shown in Fig. 1 into engagement with the locking recesses 41 of the hub 40 of the drive pinion. It will be noted that the hub 40 has locking recesses 41 of considerably greater width than the width of the lugs 33 of the clutch ring 34 and also that hub 42 on the countershaft has locking recesses 45 of considerably greater width than the lugs 45 of the clutch ring 43. Now, therefore, the clutch ring 34 may be moved so as to bring the lugs 33 completely into engagement with the locking recesses 41 of the drive pinion without moving the lugs 45 on the clutch ring 43 into engagement with the gear 25 on the countershaft. In this position the countershaft is driven from the main shaft, yet the change-speed gear 25 on the countershaft has not been picked up. This position might be termed a neutral position in that while the countershaft is being driven by the driving shaft the change-speed gears remain idle. By this movement also the clutch ring 57 has moved the sliding keys 55 into engagement with the hub 53 locking the sleeve 19 to the main shaft.

If it is now desired to drive the gearing in second speed the clutch ring 34 is moved to the furthermost position of engagement with the drive pinion 37, which movement brings the lugs 44 of the clutch ring 43 into engagement with the locking recesses 46 of the change-speed gear 25 on the countershaft, thereby rotating the gear 21 and through such gear the main shaft.

If it is desired to drive in low speed or reverse speed the clutch ring 43 is moved forwardly to the neutral position which disengages the clutch ring 43 from the gear 25 but leaves the clutch ring 34 in engagement with the drive pinion. The clutch ring 49 is now moved to bring the lugs 48 either into engagement with the reverse gear to drive the gearing in reverse or in the opposite direction into engagement with the low speed gear 26 to drive the gearing in low speed. In these various change-speed positions it will be remembered the keys 55 are engaged with the hub 53 to lock the sleeve 19 to the main shaft.

What I claim is:

1. In change-speed gearing, a drive shaft having a hollow hub, a main shaft having an end disposed within said hub, a countershaft, change-speed gears on the main shaft and change-speed gears on the countershaft, a clutch member rigid on the end of the main shaft interior the hub, a clutch member independently rotatable on the main shaft and coupled with the countershaft to drive the same, a clutch device connected with the drive shaft operable to engage the clutch member rigid on the main shaft to drive the main shaft with the drive shaft and operable to engage the clutch member rotatable on the main shaft to drive the countershaft.

2. In change-speed gearing, a drive shaft, a main shaft, a countershaft, change-speed gears on the main shaft and change-speed gears on the countershaft, a hub rotatable with the drive shaft hollowed out to receive the end of the main shaft and slotted longitudinally to provide guideways for a movable clutch device, a clutch ring encircling the said hub having lugs extending through the guideways of the hub into the interior thereof, a clutch collar carried by the main shaft having locking recesses to engage the lugs on the ring to couple the main shaft with the drive shaft to rotate therewith, a drive pinion freely rotatable on the main shaft having locking recesses to engage the lugs on the ring to couple the drive shaft to the countershaft.

3. In change-speed gearing, a drive shaft, a main shaft, a countershaft, change-speed gears to couple the main shaft and countershaft together, a hub on the drive shaft hollowed out to receive the end of the main shaft, a clutch member interior the hub rotatable with the main shaft, a clutch member mounted on the main shaft to permit independent rotation thereof, a movable clutch device rotatable with the hub intermediate said clutch members movable into engagement with one of said members to couple the main shaft to the drive shaft to rotate therewith and movable into engagement with the other of said members to couple the drive shaft to the countershaft.

4. In change-speed gearing, a drive shaft, a main shaft, a countershaft, change-speed gears to couple the drive shaft to the main shaft through the countershaft, a clutch member rigid on the main shaft, a clutch member rotatable on the main shaft, clutch mechanism connected to the drive shaft intermediate said members movable into engagement with the member rigid on the main shaft to couple the main shaft to the drive shaft to rotate therewith and movable into engagement with the clutch member rotatable on the main shaft to couple the drive shaft to the countershaft.

5. In change-speed gearing, a drive shaft, a main shaft, a countershaft, change-speed gears to couple the drive shaft to the main shaft through the countershaft, a clutch member rigid on the main shaft, a drive clutch pinion rotatable on the main shaft having engagement with the countershaft to drive the same, clutch mechanism connected to the drive shaft disposed between said clutch member and drive pinion movable into engagement with one to couple the main shaft to the drive shaft to rotate therewith and movable into engagement with the other to couple the drive shaft to the countershaft.

6. In change-speed gearing, a drive shaft, a main shaft, a countershaft, change-speed gears to couple the drive shaft to the main shaft through the countershaft, a clutch member rigid on the main shaft, a clutch member rotatable on the main shaft, clutch mechanism intermediate said clutch members having a position therebetween of complete disengagement therefrom operable to connect the clutch member rigid on the main shaft with the drive shaft to rotate the main shaft as one piece with the drive shaft and operable to connect the drive shaft with the clutch member rotatable on the main shaft to drive the countershaft.

7. In change-speed gearing, a drive shaft having a clutch member rotatable therewith, a main shaft, a countershaft, a clutch member on the main shaft rotatable therewith, a second clutch member on the main shaft rotatable independently thereof, the second clutch member coupled to the countershaft to drive the same, a clutch device operable to connect the clutch member on the drive shaft with the clutch member on the main shaft rotatable therewith to drive the main shaft with the drive shaft, said clutch device also operable to connect the clutch member on the drive shaft with the clutch member on the main shaft independently rotatable thereon to drive the countershaft, change-speed gears mounted on the countershaft to permit independent rotation thereof, change-speed gears mounted on the main shaft to permit independent rotation thereof, clutch devices on the countershaft operable to connect independent change-speed gears thereon to the countershaft to rotate therewith, said last-named clutch devices coupled with the first-mentioned movable clutch device for operation therewith having a limited movement while in disengaged position sufficient to permit said first-mentioned clutch device to couple the drive shaft with the clutch member rotatable on the main shaft to drive the countershaft.

8. In change-speed gearing, a drive shaft, a main shaft, a countershaft, change-speed gears to couple the main shaft with the drive shaft, a clutch member rigid on the main shaft, a clutch member rotatable on the main shaft having engagement with the countershaft to rotate the same, a clutch device connected to the drive shaft operable to engage the clutch member rigid on the main shaft to couple the same with the drive shaft to rotate therewith and operable from such position to a position of complete disengagement and operable also from the position of complete disengagement to engagement of the clutch member rotatable on the shaft to couple the main drive shaft to the countershaft.

9. In change-speed gearing, a drive shaft, a main shaft, a countershaft, change-speed gears on the main shaft and change-speed gears on the countershaft, a hub rotatable with the drive shaft hollowed out to receive the end of the main shaft, a clutch collar on the main shaft interior the hub, a drive clutch pinion freely rotatable on the main shaft having a clutch portion in proximity said clutch collar, a clutch device rotatable with the hub operable to be moved into engagement with the clutch collar to couple the main shaft with the drive shaft to rotate therewith and operable to be moved into engagement with the clutch drive pinion to couple the drive to the countershaft.

10. In change-speed gearing, a drive shaft, a main shaft, a countershaft, change-speed gears on the main shaft and change-speed gears on the countershaft, a hub rotatable with the drive shaft hollowed out to receive the end of the main shaft, a clutch collar on the main shaft interior the hub, a drive clutch pinion freely rotatable on the main shaft coupled with the countershaft to drive the same, said drive clutch pinion having a clutch portion spaced from said clutch collar, a clutch device rotatable with the hub operable to be moved into engagement with the clutch collar to couple the main shaft with the drive shaft to rotate therewith and operable to be moved out of engagement therewith into the space between the clutch collar and the clutch drive pinion in which position it is completely disengaged from the clutch collar and from the clutch drive pinion and operable to be moved therefrom into engagement with the clutch drive pinion to couple the drive to the countershaft.

11. In change-speed gearing, a drive shaft, a main shaft, a countershaft, change-speed gears on the main shaft, change-speed gears on the countershaft, a drive pinion mounted on the main shaft for independent rotation, said drive pinion coupled with the counter shaft to drive the same, a clutch member connected with the drive shaft operable to engage the main shaft to rotate with the drive shaft, said clutch member also operable to engage the drive pinion on the main shaft to rotate the countershaft, and clutch devices on the countershaft operable to couple a change-speed gear thereon to the countershaft to rotate therewith, said last-named clutch device operatively coupled with the first-mentioned clutch member to be operated therewith but having sufficient movement while in disengagement from the gear on the countershaft to permit the first-mentioned clutch member to engage the drive shaft with the drive pinion to rotate the same.

12. In change-speed gearing, a drive shaft, a main shaft, a countershaft, change-speed gears to couple the main shaft with the drive shaft, a hub rotatable with the drive shaft hollowed out to receive the end of the main shaft, a clutch drive pinion rotatable on the main shaft disposed adjacent said hub, a clutch device rotatable with the main shaft, a clutch device connected to the drive shaft operable to engage the clutch device rotatable with the main shaft to couple the main shaft directly with the drive shaft to rotate therewith and operable to engage said drive clutch pinion to couple the main shaft to the drive shaft through the countershaft, said main shaft having a rear bearing support and an intermediate bearing support for the end interior the hub.

In testimony whereof, I sign this specification.

JESSE H. HAND.